(12) United States Patent
Biebl et al.

(10) Patent No.: US 12,553,723 B2
(45) Date of Patent: Feb. 17, 2026

(54) SYSTEM AND METHOD FOR DETECTING THE SURROUNDINGS OF A VEHICLE

(71) Applicant: Bayerische Motoren Werke Aktiengesellschaft, Munich (DE)

(72) Inventors: Erwin Biebl, Munich (DE); Rodrigo Perez, Munich (DE); Ralph Helmar Rasshofer, Aichach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 409 days.

(21) Appl. No.: 18/034,459

(22) PCT Filed: Sep. 20, 2021

(86) PCT No.: PCT/EP2021/075810
§ 371 (c)(1),
(2) Date: Apr. 28, 2023

(87) PCT Pub. No.: WO2022/089837
PCT Pub. Date: May 5, 2022

(65) Prior Publication Data
US 2024/0353229 A1  Oct. 24, 2024

(30) Foreign Application Priority Data
Oct. 29, 2020 (DE) ............ 10 2020 128 461.6

(51) Int. Cl.
*G01C 21/28* (2006.01)
*G06N 3/045* (2023.01)
*G06F 18/24* (2023.01)
*G06V 20/56* (2022.01)

(52) U.S. Cl.
CPC ............ *G01C 21/28* (2013.01); *G06N 3/045* (2023.01); *G06F 18/24* (2023.01); *G06V 20/56* (2022.01)

(58) Field of Classification Search
USPC .......................................... 702/189
See application file for complete search history.

(56) References Cited

U.S. PATENT DOCUMENTS

| 11,221,929 | B1 * | 1/2022 | Katz | .............. G06N 3/04 |
| 2018/0308202 | A1 | 10/2018 | Appu et al. | |
| 2020/0175286 | A1 * | 6/2020 | Major | ............... G06V 10/764 |

(Continued)

FOREIGN PATENT DOCUMENTS

DE    10 2018 209 595 A1    12/2019

OTHER PUBLICATIONS

Bose, L. et al., "A Camera That CNNs: Towards Embedded Neural Networks on Pixel Processor Arrays", 2019 IEEE/CVF International Conference on Computer Vision (ICCV), IEEE, Oct. 27, 2019, pp. 1335-1344, XP033723837 (10 pages).

(Continued)

*Primary Examiner* — Paul D Lee
(74) *Attorney, Agent, or Firm* — Crowell & Moring LLP

(57) ABSTRACT

A system for detecting the surroundings of a vehicle includes a sensor module and a plurality of computing devices which are spatially separated from one another and which are configured to process the detected surroundings data by way of an artificial neural network. The artificial neural network includes multiple layers of artificial neurons. Each computing device implements a partial number of the layers.

11 Claims, 4 Drawing Sheets

(56) References Cited

U.S. PATENT DOCUMENTS

| | | | |
|---|---|---|---|
| 2020/0202168 A1* | 6/2020 | Mao | G06V 10/809 |
| 2021/0303872 A1* | 9/2021 | Makke | H04W 4/44 |
| 2021/0383209 A1* | 12/2021 | Brahma | G06V 20/56 |
| 2021/0406560 A1* | 12/2021 | Park | G01S 13/867 |
| 2022/0092412 A1* | 3/2022 | Srivastava | G06N 3/08 |

OTHER PUBLICATIONS

International Search Report (PCT/ISA/210) issued in PCT Application No. PCT/EP2021/075810 dated Dec. 13, 2021 with English translation (six (6) pages).
German-language Written Opinion (PCT/ISA/237) issued in PCT Application No. PCT/EP2021/075810 dated Dec. 13, 2021 (seven (7) pages).
German-language Search Report issued in German Application No. 10 2020 128 461.6 dated Jun. 10, 2021 with partial English translation (12 pages).
"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).
"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).
Grigorescu S. et al., A Survey of Deep Learning Techniques for Autonomous Driving, Mar. 24, 2020 (28 pages).
Huang Y. et al., Autonomous Driving with Deep Learning: A Survey of State-of-Art Technologies, Jul. 4, 2020, XP055868668 (33 pages).
FLIR launches industry's first' deep learning camera, Jan. 19, 2020, pp. 1-2, XP055868732 (two (2) pages).

* cited by examiner

SYSTEM AND METHOD FOR DETECTING THE SURROUNDINGS OF A VEHICLE

BACKGROUND AND SUMMARY OF THE INVENTION

The invention relates to a system and to a method for detecting the surroundings of a vehicle. The invention furthermore relates to a computer program and to a computer-readable medium that support such a system and method.

The invention may be used in particular as part of a driver assistance system (DAS). This may in particular concern a DAS that enables at least partially automated driving of the vehicle.

The term "automated driving" in the context of this document may be understood to mean driving with automated longitudinal or transverse guidance or autonomous driving with automated longitudinal and transverse guidance. The term "automated driving" as used in this document comprises automated driving with any degree of automation. Exemplary degrees of automation are assisted, partly automated, highly automated or fully automated driving. These degrees of automation have been defined by the German Federal Highway Research Institute (BASt) (see BASt publication "Forschung kompakt" [Compact research], issued Nov. 2012). In the case of assisted driving, the driver continuously performs longitudinal or transverse guidance while the system takes over the respective other function within certain limits. In the case of partly automated driving (TAF), the system takes over the longitudinal and transverse guidance for a certain duration and/or in specific situations, wherein the driver has to continuously monitor the system as in the case of assisted driving. In the case of highly automated driving (HAF), the system takes over the longitudinal and transverse guidance for a certain duration without the driver having to continuously monitor the system; the driver must however be capable within a certain time of taking over vehicle guidance. In the case of fully automated driving (VAF), the system is able to automatically manage driving in all situations for a specific application case; a driver is then no longer required for this application case. The four degrees of automation mentioned above in accordance with the definition of the BASt correspond to SAE Levels 1 to 4 of the SAE J3016 standard (SAE—Society of Automotive Engineering). By way of example, highly automated driving (HAF) according to the BASt corresponds to Level 3 of the SAE J3016 standard. SAE J3016 furthermore also provides SAE Level 5 as the highest degree of automation, this not being contained in the definition of the BASt. SAE Level 5 corresponds to driverless driving, in which the system is able to automatically manage all situations in the same way as a human driver throughout the entire journey; a driver is then generally no longer required.

Driver assistance systems are generally dependent on at least partially detecting the vehicle surroundings, for example in order to recognize whether there is an object in the vehicle surroundings that needs to be taken into consideration by the DAS. In this case, the DAS, depending on its functional design, would react to the object and for example warn the driver of the vehicle and/or automatically reduce a hazard level resulting from the object.

It is known in principle to use artificial intelligence methods, such as for example so-called "deep learning" by way of artificial neural networks (ANN), for particular surroundings detection tasks as part of DAS. The article "A Survey of Deep Learning Techniques for Autonomous Driving" by Grigorescu et al., available on the Internet at https://arxiv.org/abs/1910.07738, gives an overview of known approaches in this field.

Processing data as part of the surroundings detection often consumes a great deal of computing power and energy, since large amounts of data are generally acquired, transmitted and processed here. However, it is generally desirable to keep the computing power or energy to be expended on board a vehicle for data processing purposes as low as possible.

Based on this, the invention is based on the object of specifying a system and method, each improved in particular in terms of its efficiency, for detecting the surroundings of a vehicle.

The object is achieved by a system and a method according to the claimed invention. It is pointed out that additional features of a patent claim dependent on an independent patent claim, without the features of the independent patent claim or only in combination with a subset of the features of the independent patent claim, may form a separate invention independent of the combination of all of the features of the independent patent claim and that may be made into the subject matter of an independent claim, a divisional application or a subsequent application. This applies analogously to the technical teaching described in the description, which teaching may form an invention independent of the features of the independent patent claims.

A first aspect of the invention relates to a system for detecting the surroundings of a vehicle.

The vehicle may in particular be a motor vehicle, that is to say a land vehicle that is moved by mechanical force without being tied to rails. A motor vehicle may in this sense be in the form for example of a car, motorcycle or towing machine.

Detecting the surroundings of the vehicle is understood to mean at least partially detecting vehicle surroundings, for example for the purpose of forming a surroundings model that may serve as a basis for operating a DAS. The DAS may for example allow automated driving of the vehicle. The term "automated driving", as mentioned in the introduction, is in this case basically understood to mean a broad spectrum of possible degrees of automation, including that of just assisted driving.

The system comprises a sensor module (or sensor head module) for acquiring surroundings data, that is to say data in relation to the vehicle surroundings, which indicate for example the presence of objects in the vehicle surroundings.

The sensor module is preferably arranged in or on the vehicle or intended to be arranged in or on the vehicle. By way of example, the sensor module may comprise at least one sensor from the following list of sensor types: a camera (for example optical or infrared); a radar sensor, a lidar sensor; an ultrasound sensor; an acoustic sensor.

The system furthermore comprises a plurality of computing devices (that is to say at least two computing devices) that are spatially separate from one another. Each of the computing devices may for example comprise one or more processors, such as for example CPUs and/or GPUs.

The statement that the at least two computing devices are spatially separate from one another is understood to mean that the computing devices are remote from one another and that they are not arranged for instance on the same chip or on the same circuit board within a housing (for example the sensor module), for example.

The computing devices are configured to process the acquired surroundings data. The computing devices may in this case for example be configured to jointly process the surroundings data in the sense that they are each able to carry out specific separate steps as partial tasks in the data processing.

According to embodiments of the invention, provision is made for the processing of the acquired surroundings data to be carried out by the computing devices by way of an artificial neural network, wherein the artificial neural network comprises multiple layers of artificial neurons, and wherein each of the computing devices implements a subset (assigned to the respective computing device) of the layers of artificial neurons.

It should be borne in mind that the multiple artificial neurons do not have to be a hardware structure per se, but rather are typically implemented in software form as part of a corresponding deep learning algorithm in the form of a suitable logic data structure (for example as matrices or vectors).

At least one of the computing devices is preferably configured to output output data from a layer, referred to here as output layer, of the subset of layers of neurons assigned thereto to a downstream computing device from the plurality of computing devices, wherein the downstream computing device is configured to receive the output data and to further process the output data by way of the subset of layers of neurons assigned thereto.

The output data may be considered to be an intermediate result of the processing of the acquired surroundings data that is able to be transmitted from one computing device to another computing device. In specific terms, the output data may for example contain information about a respective activation state of the neurons of the output layer.

According to one embodiment, at least one of the computing devices is arranged in or on the vehicle.

By way of example, at least one of the computing devices may be a computing device close to a sensor. In other words, this computing device is arranged relatively close to the sensor module (in comparison with the other computing devices from the plurality of computing devices).

The computing device close to a sensor may for example be integrated in the sensor module. The sensor module may accordingly also comprise any computing device close to a sensor, in addition to at least one sensor. The computing device may for example be arranged, with the sensor or with a computing device functionally assigned to the sensor (such as for example a microcontroller that controls functions of the sensor), in a common housing—or even on a common circuit board or on a common chip—and in this sense be integrated in the sensor module.

Provision may thus be made for example for a first computing device from the plurality of computing devices to be arranged in or on the vehicle as part of the sensor module.

As an alternative or in addition thereto, a second computing device from the plurality of computing devices may be a (possibly central) electronic control unit (for example in the form of a so-called "electronic control unit" ECU) of the vehicle or part of such an electronic control unit.

If both such a first computing device and such a second computing device are present, these may be connected to one another for example in a wired or wireless manner in order to enable data transmission.

Generally speaking, it is also within the scope of the invention for the system to be able to have an interface for wireless data transmission of an intermediate result between one of the computing devices and another of the computing devices.

Provision may furthermore be made, according to some embodiments, for at least one of the computing devices from the plurality of computing devices to be able to be arranged at a distance from the vehicle. By way of example, the computing device may be part of a backend or data center that is able to be operated for example by a vehicle manufacturer or component manufacturer or by a service provider.

According to one development, the system comprises a plurality of such sensor modules for acquiring surroundings data. The multiple sensor modules may for example comprise multiple sensors of different types, such as for example an optical camera, a radar system and a lidar system. In this case, the computing devices jointly implement a plurality of artificial neural networks. In each case one of the networks from the plurality of networks is assigned to one sensor module from the plurality of sensor modules and is configured to process the surroundings data acquired by way of the assigned sensor module.

In one possible refinement of this development, each of the sensor modules is assigned a respective computing device close to a sensor (and preferably integrated in the respective sensor module) from the plurality of computing devices, wherein each of the computing devices close to a sensor implements a subset of the layers of the network assigned to the respective sensor module. In this case, each of the computing devices close to a sensor may be configured to process the surroundings data, acquired by way of the respective sensor module, by way of the respective subset of layers and to output first output data from an (in particular last) layer of the respective subset of layers to a downstream computing device from the plurality of computing devices.

Provision may furthermore be made, in this refinement, for at least one computing device, separate from the sensor modules, from the plurality of computing devices to implement subsets of the layers of the plurality of networks. This may in particular concern those subsets of layers that are not implemented by the respective computing devices close to a sensor. The at least one computing device separate from the sensor module may in particular be configured to receive output data output by the multiple computing devices close to a sensor and to further process said output data by way of respective subsets of the artificial neural networks assigned to the sensor modules.

According to a second aspect of the invention, what is proposed is a method for detecting the surroundings of a vehicle. The method comprises the following steps:
  acquiring surroundings data way of a sensor module; and
  processing the acquired surroundings data by way of an artificial neural network, wherein the network is implemented (jointly) by a plurality of computing devices spatially separate from one another, wherein the network comprises multiple layers of artificial neurons, and wherein each of the computing devices implements a subset of the layers.

A method according to the second aspect of the invention may in particular be carried out by way of a system according to the first aspect of the invention. Embodiments of the method according to the invention may therefore correspond in the same way to the advantageous embodiments of the system according to the invention that are described above and below, and vice versa.

By way of example, the method according to one embodiment furthermore comprises the following steps:
  outputting, by way of (or from) one of the computing devices, output data from an output layer of the subset of layers assigned to this computing device to a downstream computing device of the plurality of computing devices;

receiving the output data by way of (or at) the downstream computing device; and further processing the output data by way of the subset of layers of the network assigned to the downstream computing device.

It should be borne in mind in this connection that, according to some embodiments, the output data may also be output to the downstream computing device via one (or more) intermediate stations, for example in the form of one or more data memories, that are in turn able to be accessed by the downstream computing device. A system according to the invention may accordingly have one or more data memories for the buffer storage of the output data, wherein the one or more data memories do not necessarily have to be part of a downstream computing device. By way of example, such a data memory may be part of a backend or a data center outside the vehicle.

According to one development of this embodiment, the method comprises, as a further step that preferably takes place before the steps described above, training the network in such a way that, with a given input data amount or with a given input data rate of the acquired surroundings data to be processed, a smallest possible amount or lowest possible rate of output data has to be transmitted from the computing device to the downstream computing device. In other words, the network may thus be trained such that a comparatively small data flow arises at the output layer.

The network may in this case be trained for example by way of one or more cost functions that "penalizes" the data flow through the output layer with corresponding costs. It goes without saying here that minimizing the data flow through the output layer will generally not be the sole criterion on the basis of which the network is trained. On the contrary, the training will be oriented primarily at optimizing the main function of the network, specifically for example recognition capability for object recognition or the like. Minimizing the data flow may however in this case be taken into consideration among other things, for instance as one of multiple terms of a cost function. The statement above with regard to a "smallest possible amount or lowest possible rate of output data" should therefore be understood to mean that any criterion is considered during training, but not necessarily as sole criterion.

As a result, it is thus made possible for the data to be able to be transmitted between the separate computing devices with the lowest possible data rate and accordingly for as little energy as possible to have to be expended for the data transmission between the computing devices.

A third aspect of the invention is a computer program that comprises instructions that have the effect that a system according to the first aspect of the invention carries out the method steps according to the second aspect of the invention. The computer program may in this case, according to some embodiments, also comprise multiple portions that are each able to be executed on different computing devices.

A fourth aspect of the invention is a computer-readable medium on which a computer program according to the third aspect of the invention is stored.

According to some embodiments, the invention is based on the finding that the computing power and the accompanying energy consumption that need to be expended to process surroundings sensor data on board a vehicle may be reduced by dividing a deep learning signal processing chain, provided for this purpose and comprising a deep neural network, into two or more blocks (arranged successively in series). In this case, at least one block may be executed "in situ", that is to say on board the vehicle and in particular close to a sensor, and at least one other block may run remotely from the vehicle, such as for example in a backend or data center. By way of example, sensor data processed in this way from multiple vehicle sensors (for example radar, lidar, ultrasound and one or more cameras) may be fused in the data center and a result of the sensor fusion may then be transmitted to the vehicle. This makes it possible to use computing resources outside the vehicle for some of the required computing operations and thus to shift expensive and "energy-hungry" computing power out of the vehicle.

The proposed solution at the same time takes into consideration the fact that the data transmission between computing devices that are remote from one another is also generally linked to energy expenditure. Therefore, according to some embodiments, it is proposed for some of the computations of a deep learning algorithm to be carried out close to a sensor, for example by implementing the first n layers of an artificial neural network in a computing device close to a sensor. The output data from the nth layer, the scope of which may be greatly reduced in comparison to the input data of the neural network that are delivered by the corresponding sensor, may then be transmitted with comparatively little energy expenditure for example to an ECU of the vehicle or to a computing device in a data center outside the vehicle, on which further layers of the neural network, beginning with the layer n+1, are implemented.

It is for example also possible for an intermediate result (for example from the layer n) to first be transmitted to an ECU of the vehicle and, after the data have been processed in a few further layers of the network (for example layers n+1 to m) in the ECU, for a further intermediate result (for example from the layer m) to be transmitted "over the air" to a computing device in a data center outside the vehicle. In this external computing device, the data may then be computed in further layers (for example layers m+1 to k), in particular processed further up to a last layer k of the neural network. Output data from respective last layers of such networks that are distributed over multiple computing devices and that each process the sensor data from an associated sensor may, in the external data center, be transferred for example to a sensor data fusion artificial neural network, and a result of the sensor data fusion may finally be sent back to the vehicle "over the air". A DAS of the vehicle may then be operated on the basis of the result of the sensor data fusion.

Overall, the proposed solution thus allows cost-effective and energy-efficient processing of surroundings sensor data in the course of detecting vehicle surroundings.

The proposed solution is furthermore advantageous from data security aspects, since it is generally impossible for an unauthorized third party, from the data transmitted between the various computing devices (for example wirelessly), containing for example activation information regarding the artificial neurons of an intermediate layer or output layer of the neural network, to reconstruct the corresponding sensor raw data or otherwise meaningful data about the vehicle surroundings.

A further advantage of the distributed deep learning architecture proposed here is that it enables targeted (re-) training of specific layers of a neural network used to process surroundings sensor data. It is thus possible for example to train only the layers implemented in an external data center and/or the layers implemented in a vehicle ECU, but not the layers implemented close to a sensor (and vice versa).

The invention is now explained in more detail on the basis of exemplary embodiments and with reference to the accompanying drawings. In this case, the features and combinations of features mentioned in the description and/or shown on their own in the drawings may be used not only in the respectively indicated combination but also in other combinations or on their own without departing from the scope of the invention.

DETAILED DESCRIPTION OF THE DRAWINGS

Figure 1:
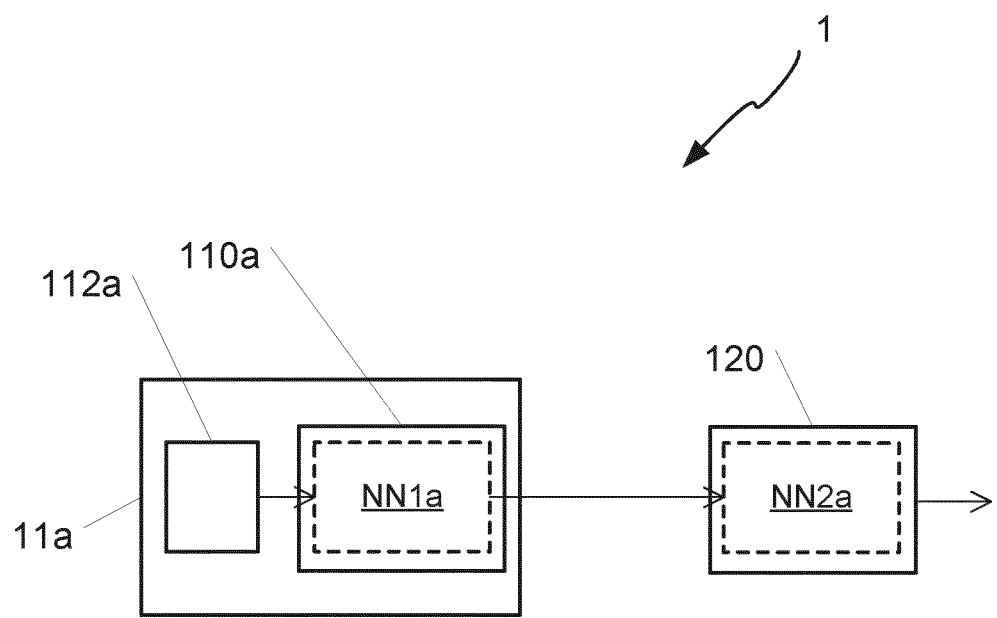
FIG. 1 shows, by way of example, a schematic block diagram of a system for detecting the surroundings of a vehicle.
Figure 2:
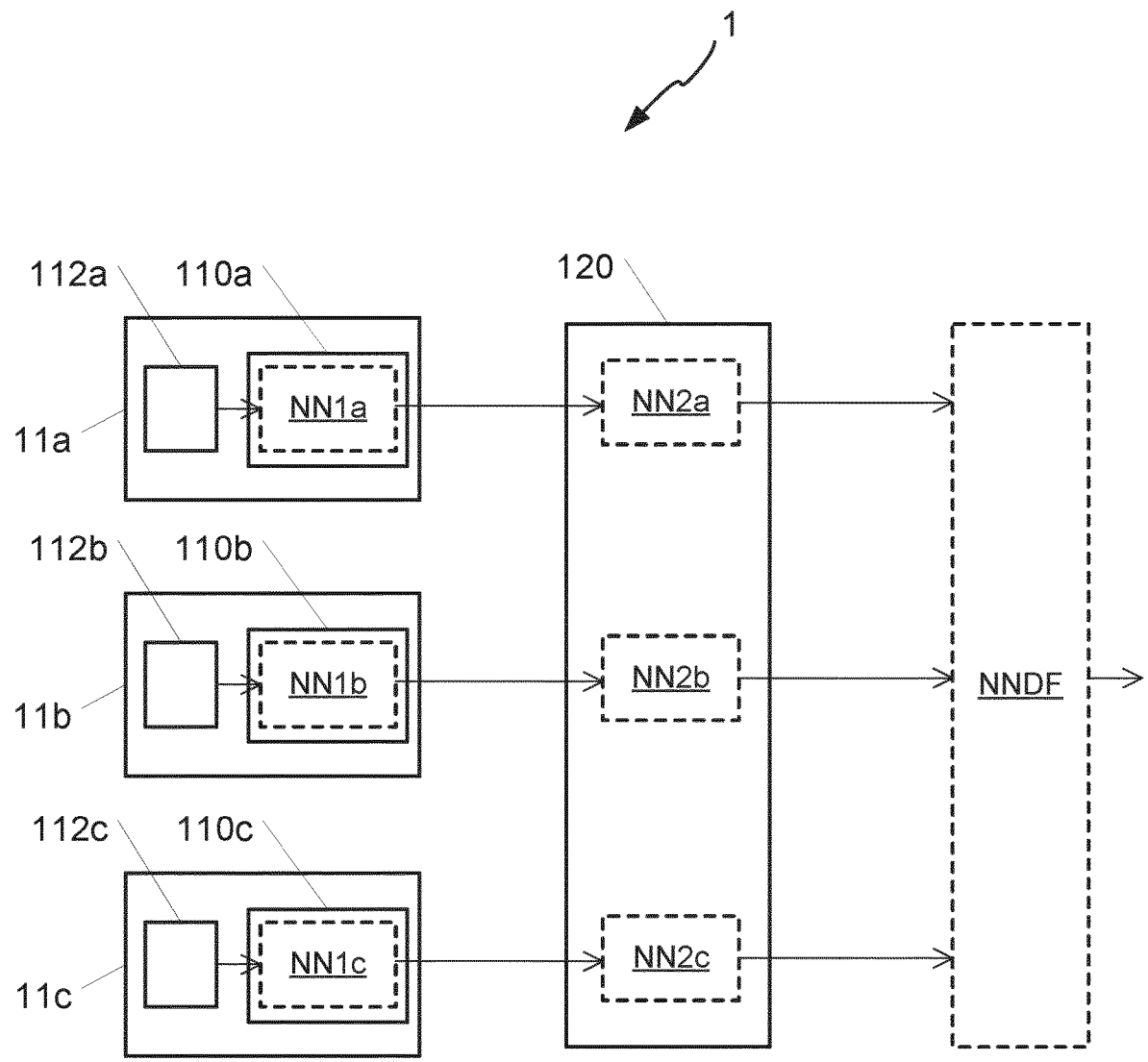
FIG. 2 shows, by way of example, a schematic block diagram of a system for detecting the surroundings of a vehicle.
Figure 3:
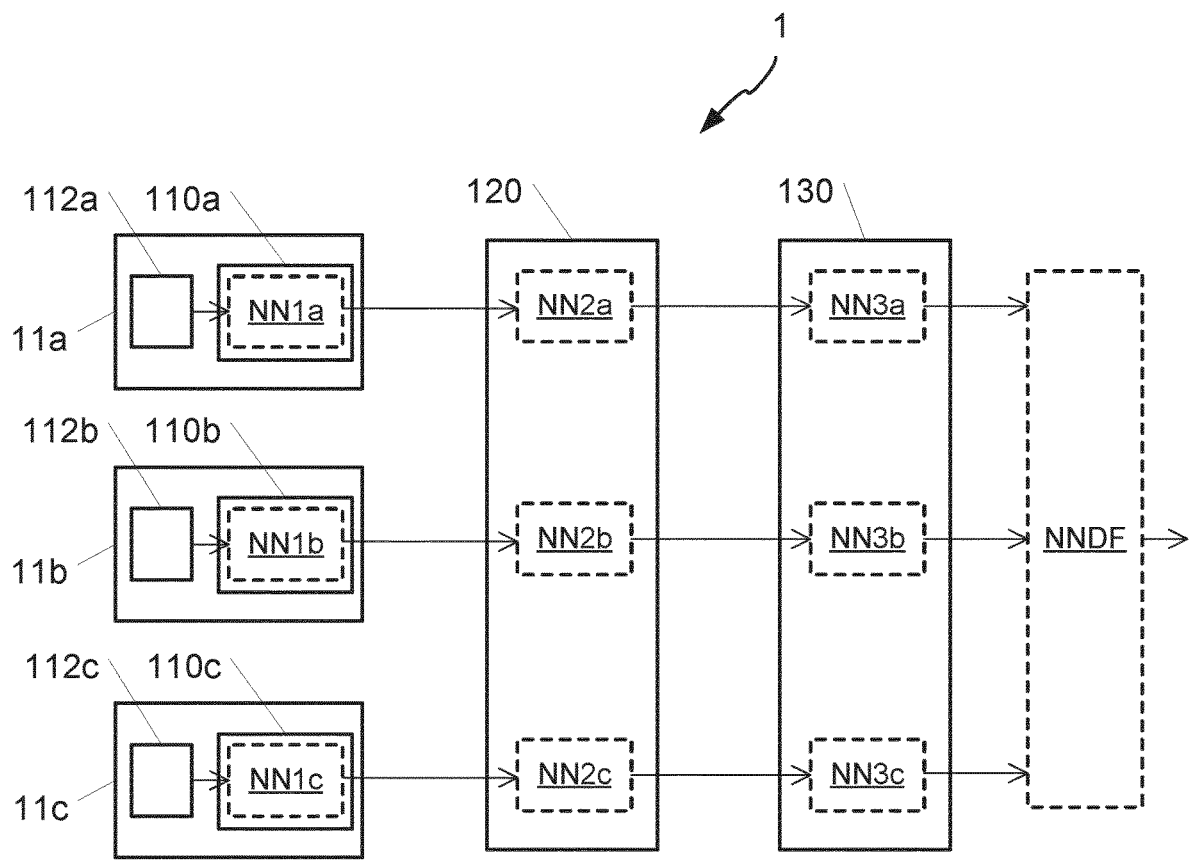
FIG. 3 shows, by way of example, a schematic block diagram of a system for detecting the surroundings of a vehicle.

FIGS. 1-3 schematically show, by way of example, various embodiments of a system 1 for detecting the surroundings of a vehicle, which will be explained below.

Figure 4:
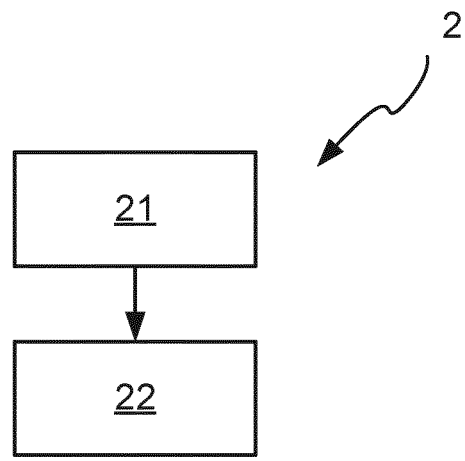
FIG. 4 shows, by way of example, a schematic flowchart of a method for detecting the surroundings of a vehicle.
Figure 5:
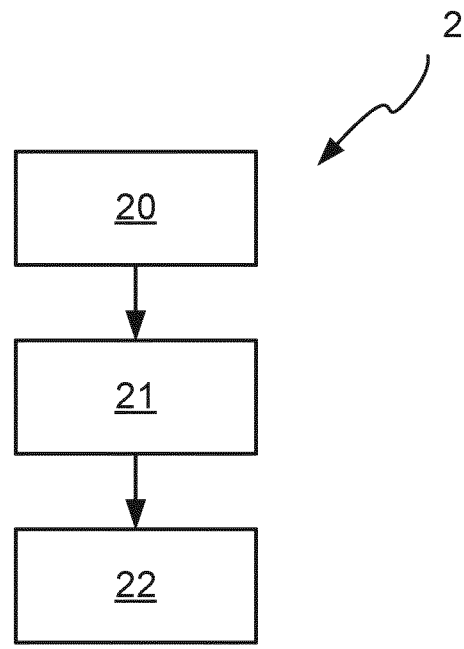
FIG. 5 shows, by way of example, a schematic flowchart of a method for detecting the surroundings of a vehicle.

In this case, reference is also made directly to the method steps 20-22 illustrated schematically in FIGS. 4-5, which method steps may be carried out by way of the systems 1.

In the embodiment according to FIG. 1, the system 1 comprises a sensor module 11a for acquiring surroundings data in relation to surroundings of the vehicle. The sensor module 11a may be arranged for example in or on the vehicle. The sensor module 11a comprises a sensor 112a. By way of example, the sensor module 11a may be a camera, a radar sensor or a lidar sensor.

The system 1 furthermore comprises a first computing device 110a, which is integrated into the sensor module 11a in the present exemplary embodiment, and a second computing device 120, which is arranged spatially separately from the sensor module 11a and thus from the first computing device 110a. In this case, the second computing device 120 has a data connection to the first computing device 110a, with a data exchange being able to take place between the computing devices 110a, 120 in a wired and/or wireless manner ("over the air").

The second computing device 120 may be for example a central electronic control unit arranged in the vehicle, such as for example a so-called ECU, of the vehicle, or part of such a control unit. As an alternative thereto, the second computing device 120 may also be arranged at a distance from the vehicle, for example as part of a backend or data center operated for example by a vehicle manufacturer or component manufacturer.

The first computing device 110a and the second computing device 120 are jointly configured (that is to say in particular programmed) to further process surroundings data, acquired by the sensor 112a, by way of an algorithm, in particular by way of a deep learning algorithm, in order for example to recognize objects, obstacles and/or traffic signs in the vehicle surroundings and thus to support surroundings model formation as a prerequisite for an at least partially autonomous mode of the vehicle.

The acquired sensor data are processed on the basis of an artificial (in particular deep) neural network NN1a, NN2a that comprises multiple layers of artificial neurons. In this case, the first computing device 110a implements a first subset NN1a of the layers of the neural network NN1a, NN2a and the second computing device 120 implements a second subset NN2a, different from the first subset NN1a, of the layers of the neural network NN1a, NN2a (wherein the first subset NN1a and the second subset NN2a are preferably separate).

A method 2 according to FIG. 4 is able to be carried out by way of the system 1 illustrated in FIG. 1: In a step 21 of this method, surroundings data are acquired by way of a sensor module 11a. In a further step 22, the acquired surroundings data are processed by way of an artificial neural network NN1a, NN2a that comprises multiple layers of artificial neurons. In this case, the network NN1a, NN2a is implemented jointly by multiple computing devices 110a, 120 spatially separate from one another, specifically in such a way that each of the computing devices 110a, 120 implements a respective subset NN1a, NN2a of the layers.

In the system 1 according to FIG. 1, the first computing device 110a is programmed to receive input data that are provided by the sensor 112a and to process them by way of the first subset NN1a of layers, which comprises for example layers 1 to n. In this case, the last layer n of the subset NN1a serves as output layer, via which an intermediate result (for example in the form of output data that contain activation information concerning the neurons of the layer n) is output for transmission to the downstream second computing device 120. In this case, the system 1 may have an interface, such as for example a mobile radio interface, for wireless data transmission of the intermediate result between the first 110a and the second computing device 120, in particular when the second computing device 120 is arranged outside the vehicle. The second computing device 120 is configured to receive the output data of the layer n and to further process them by way of the second subset NN2a of layers of the neural network NN1a, NN2a, which may comprise for example layers n+1 to m.

In accordance with the above, a method 2 according to the invention may furthermore comprise: a step in which output data from an output layer of a subset NN1a of layers assigned to a computing device 110a is output from this computing device 110a to a downstream computing device 120; a step in which the output data are received at the downstream computing device 120; and a step in which the received output data are further processed by way of the subset NN2a of layers assigned to the downstream computing device 120.

With reference to FIG. 5, the method 2 may optionally also comprise a further step 20 that preferably takes place before the steps described above: In step 20, the network is trained in such a way that, with a given input data amount or input data rate of the acquired surroundings data to be processed, a smallest possible amount or lowest possible rate of output data has to be transmitted from the computing device 110a to the downstream computing device 120. In other words, the network may thus be trained such that a comparatively small data flow arises at the output layer n. The network may be trained for example by way of one or more cost functions that "penalizes" the data flow through the output layer with corresponding costs.

The embodiments illustrated in FIGS. 2 and 3 differ from the system 1 according to FIG. 1 in that they each comprise multiple (specifically here three) sensor modules 11a, 11b, 11c having respective sensors 112a, 112b, 112c and assigned first computing devices 110a, 110b, 110c close to a sensor. By way of example, the sensors 112a, 112b, 112c may be sensors of different types, such as for example a radar sensor 112a, a lidar sensor 112b and a camera 112c. The multiple sensors 112a, 112b, 112c may however also comprise sensors of the same type, which are arranged for example at different positions in or on the vehicle and thus cover different (possibly overlapping) detection regions.

In the system 1 according to FIG. 2, each of the first computing devices 110a, 110b, 110c has a (wired or wireless) data connection to the second computing device 120, which may be for example an ECU arranged in the vehicle or a computing device of a backend or data center outside the vehicle.

Each sensor module 11a, 11b, 11c is assigned a neural network. In this case, the first computing device 110a assigned to the sensor module 11a, together with the second computing device 120, implements a first neural network NN1a, NN2a for processing the sensor data acquired by way of the sensor module 11a. The first computing device 110b assigned to the sensor module 11b, together with the second computing device 120, implements a second neural network NN1b, NN2b for processing the sensor data acquired by way of the sensor module 11b. The first computing device 110c assigned to the sensor module 11c, together with the second computing device 120, implements a third neural network NN1c, NN2c for processing the sensor data acquired by way of the sensor module 11c. The second computing device 120 thus implements a respective subset NN2a, NN2b, NN2c of the layers of the network assigned to the respective sensor module 11a, 11b, 11c, wherein the first computing device 110a, 110b, 110c integrated into the respective sensor module 11a, 11b, 11c implements another subset NN1a, NN1b, NN1c.

In the same way as with regard to what is described above with reference to FIG. 1, each of the first computing devices 110a, 110b, 110c is configured to process the surroundings data, acquired by way of the respective sensor 112a, 112b, 112c, by way of the first part NN1a, NN1b, NN1c of the artificial neural network assigned to the sensor module 11a, 11b, 11c in question and to output first output data from an output layer of the respective first NN1a, NN1b, NN1c. The second computing device 120 is configured to receive the first output data output by the first computing devices 110a, 110b, 110c and to further process them by way of the respective second parts NN2a, NN2b, NN2c of the artificial neural networks assigned to the sensor modules 11a, 11b, 11c.

The second computing device 120 of the system according to FIG. 2 is furthermore configured to provide output data from respective last layers of the second parts NN2a, NN2b, NN2c of the artificial neural networks assigned to the sensor modules 11a, 11b, 11c to a sensor data function artificial neural network NNDF. The sensor data function neural network NNDF may for example likewise be implemented on the second computing device 120 or on a further computing device (for example of a backend, in particular when the second computing device 120 is likewise arranged in the backend). The sensor data function neural network NNDF is able to combine the preprocessed surroundings data that emanate from the various sensor modules 11a, 11b, 11c and carry out a sensor data function. A result of the sensor data function may be transmitted back to the vehicle "over the air", provided that the sensor data fusion takes place outside the vehicle (such as for example in a backend or a data center).

The system 1 in the exemplary embodiment according to FIG. 3 differs from that according to FIG. 2 in that it additionally comprises a third computing device 130 on which respective third subsets NN3a, NN3b, NN3c of layers of the neural networks assigned to the sensor modules 11a, 11b, 11c are implemented.

In this exemplary embodiment, the second computing device 120 is for example an ECU on board the vehicle, and the third computing device 130 is arranged at a distance from the vehicle, such as for example in a backend or data center.

The second computing device 120 is configured to output second output data from respective last layers of the second subsets NN2a, NN2b, NN2c of layers of the artificial neural networks assigned to the sensor modules 11a, 11b, 11c.

The third computing device 130 is configured to receive the second output data "over the air" and to further process them by way of the respective third subsets NN3a, NN3b, NN3c of layers of the neural networks assigned to the sensor modules 11a, 11b, 11c. In this case, the third parts NN3a, NN3b, NN3c of the neural networks receive the second output data as input data. As illustrated in FIG. 3, in this embodiment, output data from respective last layers of the third parts NN3a, NN3b, NN3c are supplied to a sensor data function artificial neural network NNDF.

In the same way as with regard to what is described above with reference to FIG. 2, the sensor data function neural network NNDF may for example likewise be implemented on the third computing device 130 or on a further computing device in the backend or the data center. The sensor data function neural network NNDF is able to combine the pre-processed surroundings data emanating from the various sensor modules 11a, 11b, 11c and carry out a sensor data function. A result of the sensor data function may be transmitted back to the vehicle "over the air".

It is of course also possible to use other numbers (that is to say in particular including more than three) such sensor modules with respectively assigned neural networks in systems 1 of the type shown in FIGS. 1-3, wherein the neural networks may also be distributed over different numbers (that is to say in particular including over more than three) separate computing devices.

The invention claimed is:

1. A system for detecting surroundings of a vehicle, the system comprising:
a sensor module for acquiring surroundings data; and
a plurality of computing devices that are spatially separate from one another and that are configured to process the acquired surroundings data by way of an artificial neural network, wherein the artificial neural network comprises multiple layers of artificial neurons, and each of the computing devices implements a subset of the layers;
wherein one of the computing devices is configured to output data from an output layer of the subset of layers assigned to the one of the computing devices to a downstream computing device from the plurality of computing devices;
wherein the output data is received by the downstream computing device;
wherein the output data is further processed by the subset of layers of the artificial neural network assigned to the downstream computing device; and wherein the artificial neural network is trained such that, with a given data amount of the acquired surroundings data to be processed, a smallest possible amount of the output data is transmitted from the one of the computing devices to the downstream computing device.

2. The system according to claim 1, wherein:
at least one of the computing devices is configured to output output data from an output layer of a subset of layers assigned thereto to a downstream computing device from the plurality of computing devices, and
the downstream computing device is configured to receive the output data and to further process the output data by way of the subset of layers assigned thereto.

3. The system according to claim 1, wherein at least one of the computing devices is integrated in the sensor module.

4. The system according to claim 1, wherein at least one of the computing devices is arranged in or on the vehicle.

5. The system according to claim 1, wherein at least one of the computing devices is arranged at a distance from the vehicle.

6. The system according to claim 1, further comprising an interface for wireless data transmission of an intermediate result between one of the computing devices and another of the computing devices.

7. The system according to claim 1, wherein:
the system comprises a plurality of sensor modules for acquiring the surroundings data,
the computing devices jointly implement a plurality of artificial neural networks, and
each of the networks of the plurality of networks is assigned to a respective sensor module from the plurality of sensor modules and is configured to process the surroundings data acquired by way of the assigned sensor module.

8. The system according to claim 7, wherein:
each of the sensor modules is assigned a computing device close to a sensor from the plurality of computing devices, and
each of the assigned computing devices implements a subset of the layers of the network assigned to the respective sensor module.

9. The system according to claim 8, wherein at least one computing device separate from the sensor modules from the plurality of computing devices implements subsets of the layers of the plurality of networks.

10. A computer product comprising a non-transitory computer readable medium having stored thereon program code which, when executed on a processor, causes the system according to claim 1 to carry out a method of detecting the surroundings of the vehicle by:
acquiring the surroundings data by way of the sensor module; and
processing the acquired surroundings data by way of the artificial neural network.

11. A method for detecting surroundings of a vehicle, the method comprising:
acquiring surroundings data by way of a sensor module;
processing the acquired surroundings data by way of an artificial neural network, wherein:
the network is implemented by a plurality of computing devices that are spatially separate from one another,
the network comprises multiple layers of artificial neurons, and
each of the computing devices implements a subset of the layers;
outputting, by way of one of the computing devices, output data from an output layer of the subset of layers assigned to the one of the computing devices to a downstream computing device from the plurality of computing devices;
receiving the output data by way of the downstream computing device;
further processing the output data by way of the subset of layers of the network assigned to the downstream computing device; and
training the network such that, with a given data amount of the acquired surroundings data to be processed, a smallest possible amount of the output data is transmitted from the one of the computing devices to the downstream computing device.

* * * * *